Feb. 7, 1961 J. J. HENRY 2,970,604
LIQUID STORAGE TANKS AND ATTACHMENTS
Filed June 24, 1958
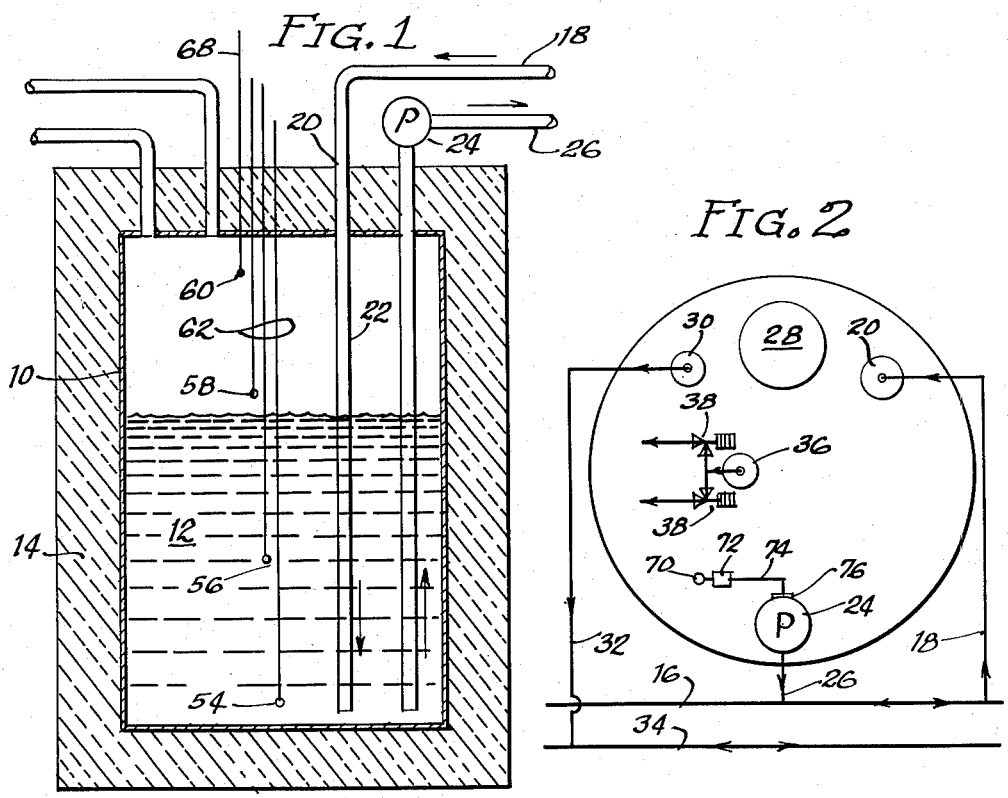
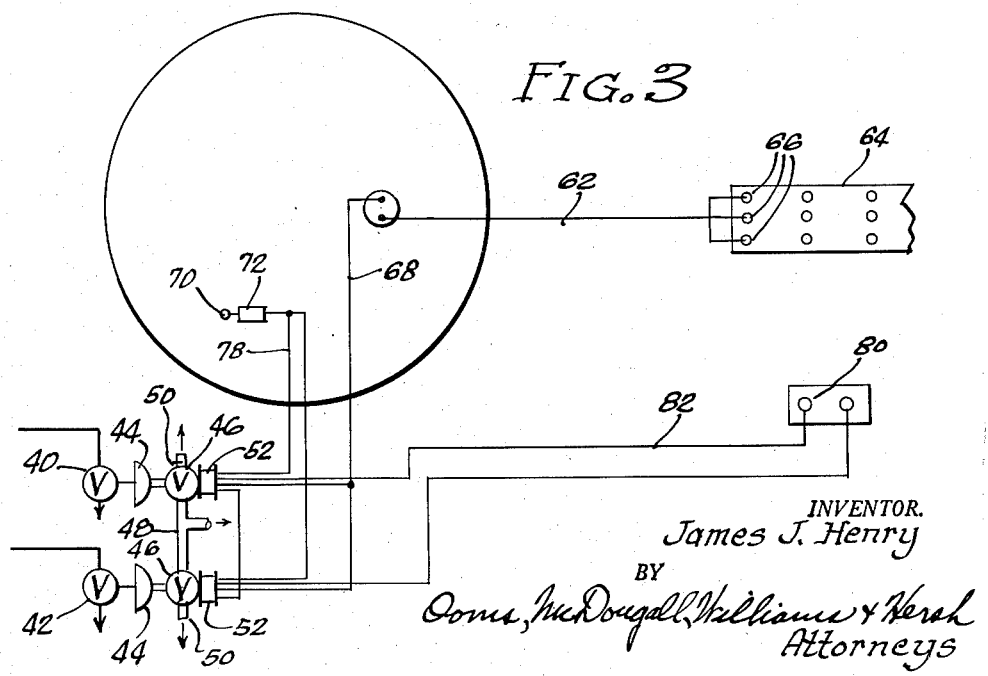
INVENTOR.
James J. Henry
BY
Ooms, McDougall, Williams & Hersh
Attorneys @# United States Patent Office 2,970,604
Patented Feb. 7, 1961

2,970,604

LIQUID STORAGE TANKS AND ATTACHMENTS

James J. Henry, New York, N.Y., assignor, by mesne assignments, to Conch International Methane Limited, Nassau, Bahamas, a corporation of the Bahamas Filed June 24, 1958, Ser. No. 744,226

4 Claims. (Cl. 137—206)

This invention relates to the storage and transportation of a liquid, and it relates more particularly to tanks of large capacity for the storage of a cold liquid, such as a liquefied gas, and to the means employed in combination with the tanks for controlling the flow of liquid into and out of the tanks during the operation of filling and discharging.

The invention will be described with reference to the transportation of a gas, such as a natural gas, from a source of plentiful supply to an area where a deficiency exists. In the case of natural gas, transmission in large volume in the gaseous state has been achieved by pipeline connecting the two areas. While transmission by pipeline is practical between areas that are connected by land, pipeline operation is believed to be impractical where the area of supply is separated from the area of use by a large body of water.

Considerable research and development have been expended in the formation of an industry for the transportation of such gaseous materials by a means other than pipeline. Confinement of the gas in suitable tanks for ship transportation has been considered, but it has been found to be impractical because of the relatively small quantity of gas capable of being housed in tanks. It is known, however, that as much as 600 times more gas can be housed in a given space when reduced to a liquefied state as compared to the gaseous state at equivalent pressure. Thus the system which is being developed for commercial operation comprises the liquefaction of the gas at the source of plentiful supply for ship transportation in suitable tanks in a liquefied state to an area where the deficiency exists, where the liquefied gas can be re-formed into a gaseous state for use.

Transportation is to be made with the liquid housed in insulated storage tanks of large capacity whereby it becomes practical to design the tanks for housing the liquid at about atmospheric pressure or slightly above. In the case of natural gas, which is composed mostly of methane having a boiling point of about −258° F. at atmospheric pressure, this means that the liquefied gas will have to be housed at a temperature below about −240° F., depending somewhat upon the amount of heavier hydrocarbons in the natural gas.

In practice, the liquefied gas will be loaded into insulated land storage tanks at the source of plentiful supply to build up a quantity of liquid for use in filling the insulated storage tanks mounted in the hold of the ship for ship transportation in the liquefied state to the area where a deficiency exists. At the destination, the cold liquid will be discharged from the insulated ship's tanks into insulated tanks on short for storage until reformed to the gaseous state for use.

The economics of the system depend, at least in part, on the most efficient utilization of the storage space in the transportation means. Thus it is desirable to load and unload the ship's tanks as rapidly as possible to minimize the time that the ship is tied up in port for such operations. Rapid loading and unloading raises a number of problems from the standpoint of safety and operation.

For example, the amount of pressure that can be tolerated in the ship's tanks will be limited by reason of their large capacity. Thus it is desirable to provide means for controlling the flow of liquid into and out of the tanks. Pressure build-up within the tanks is not always proportional to the rate of flow since a considerably larger amount of liquid will be vaporized during the initial portion of the filling cycle when the tanks are warmer, while lesser amounts of vapor will be formed in the tanks near the end of the filling cycle when the interior of the tanks will be substantially completely cooled down.

Further, in the light of the fact that the tanks will all be confined within a heavily insulated space within the hold of the ship, visual examination to determine the liquid level in the tanks will not be possible. Thus it is desirable to device other suitable means for indicating the level of liquid in each of the tanks and means for controlling the flow of liquid into the tanks for terminating flow when the tanks are filled to a desired level.

Thus it is an object of this invention to provide a means and a method for the storage and/or transportation of a cold boiling liquid, and it is a related object to provide a method and means for filling and discharging storage tanks with a cold boiling liquefied gas.

More specifically, it is an object of this invention to provide an insulated tank of large capacity for the storage and transportation of a liquefied gas, and it is a related object to provide a means for indicating the level of liquid in the insulated tanks; to provide a means for controlling the flow of liquid into and out of the tanks to avoid the build-up of excessive pressures, and it is an object to provide a means for controlling the flow of liquid into and out of the tanks to avoid overfilling or underfilling.

These and other objects and advantages of this invention will hereinafter appear and for purposes of illustration, but not of limitation, and embodiment of the invention is shown in the accompanying drawings, in which—

Figure 1 is a schematic elevational view of a storage tank embodying the features of this invention;

Figure 2 is a top plan view schematically illustrating elements operative in combination with the tanks for carrying out the features of this invention; and Figure 3 is a view similar to that of Figure 2 showing other of the attachments employed in the practice of this invention.

Referring now to the drawings for a description of the concepts of this invention, the numeral 10 represents a tank formed of aluminum, alloy of aluminum, copper, stainless steel or other metal capable of retaining its ductility at the temperature of the liquefied gas 12 housed therein. The tank is surrounded with insulation 14 to minimize heat transfer which would otherwise cause excessive vaporization of the liquid by reason of the wide temperature differential between the temperature and boiling point of the liquid and ambient atmosphere. The storage space would comprise the insulated hold of a ship in which one or more tanks 10 are positioned for transportation of the cold liquid. While the tanks are indicated as being round, use will preferably be made of tanks of rectangular or other polygonal shape for more efficient utilization of the insulated hold space. It will be understood that the concepts hereinafter described will have application also to the filling and discharging of land storage tanks at the station of use since many of the same limitations and conditions will prevail.

The tanks 10 of many thousands of barrels' capacity are connected to the shore tank for filling or discharging through a main header 16 which, in the illustrated modification, may be as large as 12 or more inches in diameter for flowing a large stream of the liquid into and out of the tanks. The main header is connected by branch lines 18 to the inlet 20 to the tanks for introduction of the liquid in filling the tanks. The discharge pipe 26, which extends to the bottom of the tank, is provided with a pump 24 for displacing the liquid from the discharge pipe into the passage 26 leading into the main header 16 which, at the station of use, would be connected to the storage facility on shore.

Other attachments in the tank include a manhole 28 for gaining access to the interior of the tank; a vapor outlet 30 for the removal of vapors from the tank into a line 32 connecting the vapor outlet with the vapor header 34 through which the vapors from the tank may be disposed of; and a relief outlet 36 controlled by pressure valves 38 for relieving pressure built up in the tank by excessive vaporization and the like. These facilities do not enter into the concepts of this invention and thus further description thereof, as well as other attachments, and their operation will not be made.

An important concept of this invention resides in the features which contribute materially to the operation of the system in filling and discharging the tanks with the cold boiling gas. In many ways, the elements hereinafter described cooperate one with the other to provide safety essential to the practice of the system, and thus constitute an important part of the overall process of making natural gas available in commercial and economical quantities to an area where a deficiency exists and which is incapable of being supplied by pipe line or the like.

Referring now to Figure 3, the numerals 40 and 42 indicate valves in the main header 16 on the port and starboard sides of the ship. In the illustrated modification, the valves are air-operated valves which are adapted to be either in open position or in closed position responsive to operation by air pressure on a diaphragm 44, a valve being closed upon loss of air from the diaphragm. Pressure on the diaphragm is adapted to be controlled by a three-way air valve 46 having an inlet supplied by line 48 with air under pressure, an outlet 50 communicating with the atmosphere and an outlet communicating with the diaphragm. The three-way valves are each separately controlled by a separate solenoid 52. The solenoid is adapted for operation in response to pressures existing in the tank, or for operation in response to the level of liquid in the tank, as will hereinafter be pointed out.

The interior wall of each of the tanks is provided with a plurality of vertically spaced-apart contacts, such as contacts 54, 56, 58 and 60, the latter of which is adapted to be made when liquid reaches the desired level or when the tank is filled. All of the contacts below the contact 60 are connected by electrical conductors 62 to a control panel 64 having vertically arranged rows of an indicating means, such as lights 66 for each tank, with an indicator in each row operatively connected to one of the contacts for indicating the approximate level of liquid in the particular tank.

The upper or fill contact is connected by an electrical conductor 68 to transmit an impulse to the solenoids 52 for operation of the solenoids to close the valves when the liquid in the tank has reached the desired level. The high level contact 60 may be similar to those used for the intermediate level indicators or it can be in the form of a float which rides on the surface of the liquid to operate a switch or valve when the high level of liquid in the tank is reached. In the alternative, both means for control may be employed in combination to stop the flow of liquid when the tank is filled. It will be further understood that the spaced relationship between the contacts may be varied and that more or less contacts may be employed in the tanks as indicators and controls.

Manually operated or pneumatically operated switches 80 may be installed in any selected remote location for controlling the operation of the valves 40 and 42. The switches 80 are connected by the conductors 82 to the solenoids 52 for actuation.

An opening 70 is also provided in the top wall of the tank for establishing communication between the interior of the tank and a pressure-operated switch 72 having a connection 74 with the control means 76 for operation of the pump 24 for stopping the pump when the pressure in the tank is reduced beyond a predetermined minimum. The switch 72 also has electrical connections 78 with the solenoids 52 for stopping the flow of liquid into the tanks when the pressure in the tank or tanks exceeds a predetermined maximum.

The latter represents a very important part of the operation since the large tanks will be limited in the amount of pressure capable of safely existing therein, especially during the initial portion of the filling operation, when the amount of vaporization that takes place as the cold liquid hits the warmer interior of the tanks, may result in the production of vapors far in excess of those capable of being disposed of through the usual vent means. Thus pressure will tend rapidly to build up within one or more of the tanks unless the introduction of liquid is stopped. Such build-up of pressure can also inadvertently occur even during the lateral stages of the filling operation if the liquid is being introduced at too rapid a rate or if, for some reason or another, the vapors cannot be vented properly from the tank. Under such circumstances, pressure will build up until the pressure switch 72 is operated to effect corresponding operation of the solenoid 52 to close the valves 40 temporarily to stop further flow of liquid into the tank or tanks.

Subatmospheric pressures or vacuums are just as much to be avoided as excessive positive pressures. Subatmospheric pressure can develop when the liquid is being removed from the tank or tanks at a rate faster than the vapors can be bled into the tanks for replacement of the liquid. Under such circumstances, vacuum will build up in the tank until the pressure switch 72 is operated to shut off the power to the pump 24, thereby at least temporarily to stop further removal of liquid.

The described valve and pump controls may be provided for each tank or for the entire group of tanks. Separate operation for individual tanks is preferred since the difficulty may lie only with one of the tanks, thereby to stop the filling or discharging operation with respect to the individual tank while permitting normal operation to be continued with the remainder.

The described controls and operations are important to the storage and transportation of large quantities of cold boiling liquefied gas. Failure occasioned by the development of excessive pressures or overfilling could be damaging not only to the ship but to personnel in and about the ship. Thus the concepts described are employed in combination with the loading and discharging operations for the successful practice of the process of economically transporting a gas in commercial quantities from a source of plentiful supply to an area where a deficiency exists.

It will be understood that changes may be made with respect to the specific construction or character of the elements and in their means for effecting the desired operative connections therebetween without departing from the spirit of the invention, especially as defined in the following claims.

I claim:
1. In the transmission of a cold boiling liquefied gas into and out of a storage vessel the combination comprising a storage vessel adapted to be maintained within a predetermined range of pressure above and below atmospheric pressure, a source of supply of said liquid for transmission to said storage vessel at one station and a receiver for said liquid in said storage vessel at another station, means for communicating the source of supply with said storage vessel for filling the vessel and for communicating the storage vessel with said receiver for discharging, valve means in said communicating means between said source of supply and the storage vessel for controlling the flow of fluid, pumping means for discharging fluid from said storage vessel into said communicating means, a pressure responsive means communicating with said storage vessel, means responsive to said pressure responsive means and operatively connected to said pumping means for rendering same inoperative when the pressure within the storage vessel is below a predetermined value during discharge of the liquid and other means responsive to said pressure responsive means operatively connected to said valve means for stopping the flow of fluid through said communicating means when the pressure in the storage vessel exceeds a predetermined value during filling, and pressure and vacuum relief means in communication with said storage vessel for the relief of pressure beyond a predetermined maximum and for the relief of vacuum beyond a predetermined minimum.

2. A system as claimed in claim 1 which includes manual means for operation of said valve means for controlling the flow of fluid through said communicating means.

3. A system as claimed in claim 1 which includes contacts arranged in vertically spaced-apart relation within said storage vessel in positions to be engaged by said liquid in said vessel, an indicator means for each contact and means communicating said contacts with said indicator means for indicating the level of fluid in said storage vessel.

4. A system as claimed in claim 3 in which one of said contacts is positioned to be made when the vessel is properly filled and which includes an operative connection between said contact and valve means for stopping the flow of fluid through said communicating means in response to the making of said contact.

References Cited in the file of this patent

UNITED STATES PATENTS

| | | |
|---|---|---|
| 2,061,014 | Wade | Nov. 17, 1936 |
| 2,243,188 | Biach | May 27, 1941 |
| 2,792,912 | Kangas | May 21, 1957 |